US010089645B2

(12) United States Patent
Anguiano

(10) Patent No.: US 10,089,645 B2
(45) Date of Patent: Oct. 2, 2018

(54) METHOD AND APPARATUS FOR COUPON DISPENSING BASED ON MEDIA CONTENT VIEWING

(71) Applicant: DISH Technologies L.L.C., Englewood, CO (US)

(72) Inventor: Jason Anguiano, Castle Rock, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 285 days.

(21) Appl. No.: 13/732,300

(22) Filed: Dec. 31, 2012

(65) Prior Publication Data

US 2014/0188590 A1    Jul. 3, 2014

(51) Int. Cl.
| | | |
|---|---|---|
| G06Q 30/00 | (2012.01) |
| G06Q 30/02 | (2012.01) |
| G06T 1/00 | (2006.01) |
| H04N 21/414 | (2011.01) |
| G06F 3/042 | (2006.01) |
| G06T 19/00 | (2011.01) |
| G06T 3/00 | (2006.01) |

(52) U.S. Cl.
CPC ....... *G06Q 30/0225* (2013.01); *G06F 3/0425* (2013.01); *G06Q 30/02* (2013.01); *G06Q 30/0269* (2013.01); *G06Q 30/0277* (2013.01); *G06T 1/0021* (2013.01); *G06T 1/0064* (2013.01); *G06T 3/0006* (2013.01); *G06T 19/006* (2013.01); *H04N 21/41415* (2013.01)

(58) Field of Classification Search
CPC . G06Q 30/0237; G06Q 30/02; G06Q 30/0269
See application file for complete search history.

(56) References Cited

U.S. PATENT DOCUMENTS

| | | | | |
|---|---|---|---|---|
| 5,892,535 A | * | 4/1999 | Allen | H04N 7/162 |
| | | | | 348/E5.008 |
| 5,899,999 A | * | 5/1999 | De Bonet | G06F 17/3025 |
| 5,926,647 A | * | 7/1999 | Adams | G09G 5/024 |
| | | | | 345/589 |
| 6,208,273 B1 | * | 3/2001 | Dye | H03M 7/30 |
| | | | | 341/51 |
| 7,996,264 B2 | * | 8/2011 | Kusumoto | G06Q 30/02 |
| | | | | 705/14.16 |
| 8,073,460 B1 | | 12/2011 | Scofield et al. | |
| 8,176,068 B2 | | 5/2012 | Kunjithapatham et al. | |

(Continued)

FOREIGN PATENT DOCUMENTS

WO        2012/148369 A1    11/2012

OTHER PUBLICATIONS

Briere, Danny, *Home Theater for Dummies*, Wiley Publishing, Inc., Indianapolis, Indiana, Chapter 9-10, "Introducing the Home Theater PC", and "Accessing Digital Content at Home and Over the Internet", 2008, pp. 123-155.

(Continued)

*Primary Examiner* — Luis A Brown
*Assistant Examiner* — Radu Andrei
(74) *Attorney, Agent, or Firm* — Seed IP Law Group LLP

(57) ABSTRACT

The present disclosure relates to dispensing coupons to viewers of media content and in particular, providing coupons to an individual to buy the product just after having viewed a commercial or other media program featuring that product.

17 Claims, 5 Drawing Sheets

(56) References Cited

U.S. PATENT DOCUMENTS

| | | | |
|---|---|---|---|
| 8,180,675 B2 | 5/2012 | Blasko et al. | |
| 8,185,923 B2* | 5/2012 | Slaney | G06Q 30/0241 |
| | | | 705/14.4 |
| 8,239,454 B2* | 8/2012 | Palermo | G06Q 30/02 |
| | | | 379/114.03 |
| 8,484,670 B2* | 7/2013 | Klein | H04N 21/478 |
| | | | 725/100 |
| 8,533,632 B2* | 9/2013 | Jordan | G06F 17/3089 |
| | | | 715/747 |
| 8,661,463 B2 | 2/2014 | Lee et al. | |
| 8,789,083 B1* | 7/2014 | Landers | H04N 21/25891 |
| | | | 725/10 |
| 8,791,787 B2 | 7/2014 | Hardacker et al. | |
| 2001/0038642 A1* | 11/2001 | Alvarez, II | H03M 7/30 |
| | | | 370/477 |
| 2002/0091905 A1* | 7/2002 | Geiger | H03M 7/30 |
| | | | 711/170 |
| 2002/0170056 A1 | 11/2002 | Akiyama et al. | |
| 2003/0032409 A1* | 2/2003 | Hutcheson | G06Q 30/02 |
| | | | 455/414.1 |
| 2004/0075765 A1* | 4/2004 | Schoner | H04N 21/4305 |
| | | | 348/500 |
| 2005/0289589 A1 | 12/2005 | Vermola | |
| 2006/0129458 A1* | 6/2006 | Maggio | G06Q 30/02 |
| | | | 705/14.2 |
| 2006/0282864 A1 | 12/2006 | Gupte | |
| 2007/0022437 A1* | 1/2007 | Gerken | H04N 7/17318 |
| | | | 725/41 |
| 2007/0198839 A1* | 8/2007 | Carle | H04L 9/083 |
| | | | 713/176 |
| 2007/0237185 A1* | 10/2007 | Pereira | H04N 21/2389 |
| | | | 370/503 |
| 2008/0240230 A1* | 10/2008 | Oxman | H04N 5/4401 |
| | | | 375/240.01 |
| 2008/0271072 A1 | 10/2008 | Rothschild et al. | |
| 2009/0156182 A1 | 6/2009 | Jenkins et al. | |
| 2009/0165040 A1 | 6/2009 | Anguiano et al. | |
| 2009/0192870 A1* | 7/2009 | White | G06Q 30/00 |
| | | | 705/7.29 |
| 2009/0254949 A1 | 10/2009 | Lee et al. | |
| 2009/0282452 A1* | 11/2009 | Wei | H04N 9/806 |
| | | | 725/118 |
| 2010/0048288 A1* | 2/2010 | Canterbury | G07F 17/3211 |
| | | | 463/20 |
| 2010/0049609 A1 | 2/2010 | Zhao et al. | |
| 2010/0146546 A1 | 6/2010 | Nishimura et al. | |
| 2010/0190513 A1 | 7/2010 | Andreasson | |
| 2010/0229190 A1 | 9/2010 | Koo et al. | |
| 2010/0257556 A1 | 10/2010 | Lee et al. | |
| 2010/0262987 A1 | 10/2010 | Imanilov | |
| 2010/0262992 A1 | 10/2010 | Casagrande | |
| 2010/0287035 A1* | 11/2010 | Nemitz | G06Q 10/06 |
| | | | 705/14.61 |
| 2011/0019093 A1* | 1/2011 | Zhong | H04N 5/144 |
| | | | 348/607 |
| 2011/0055005 A1* | 3/2011 | Lang | G06Q 30/02 |
| | | | 705/14.45 |
| 2011/0105094 A1 | 5/2011 | Hassan et al. | |
| 2011/0137951 A1 | 6/2011 | Baker | |
| 2011/0162007 A1* | 6/2011 | Karaoguz | H04N 21/234318 |
| | | | 725/39 |
| 2011/0218862 A1* | 9/2011 | Langston | G06Q 30/02 |
| | | | 705/14.69 |
| 2011/0237324 A1 | 9/2011 | Clavin et al. | |
| 2011/0270679 A1 | 11/2011 | Tziortzis et al. | |
| 2011/0283322 A1 | 11/2011 | Hamano | |
| 2011/0283328 A1 | 11/2011 | Davis et al. | |
| 2011/0320628 A1 | 12/2011 | Gutarin et al. | |
| 2012/0013609 A1 | 1/2012 | Reponen et al. | |
| 2012/0044420 A1* | 2/2012 | Payson | H04N 5/265 |
| | | | 348/571 |
| 2012/0128150 A1* | 5/2012 | Belenky | H04N 21/23476 |
| | | | 380/28 |
| 2012/0234906 A1 | 9/2012 | Ganapathi | |
| 2012/0249820 A1* | 10/2012 | Beauchemin | G06T 7/001 |
| | | | 348/222.1 |
| 2012/0253902 A1* | 10/2012 | Carney, II | G06Q 30/02 |
| | | | 705/14.12 |
| 2012/0310784 A1 | 12/2012 | Bartley et al. | |
| 2012/0324495 A1 | 12/2012 | Matthews, III et al. | |
| 2013/0024257 A1* | 1/2013 | Libenson | G06Q 30/02 |
| | | | 705/14.21 |
| 2013/0091239 A1 | 4/2013 | Hao et al. | |
| 2013/0139203 A1 | 5/2013 | Lee et al. | |
| 2013/0198321 A1 | 8/2013 | Martin et al. | |
| 2013/0205336 A1 | 8/2013 | Ballai et al. | |
| 2014/0359153 A1* | 12/2014 | Heng | H04L 29/06517 |
| | | | 709/231 |

OTHER PUBLICATIONS

Home Theater PC, URL: http://en.wikipedia.org/w/index.php?title=Home_theater_PC&oldid=524645400, Nov. 24, 2012, download date Apr. 7, 2014, 12 pages.

Mobile Phone Tracking, URL: http://en.wikipedia.org/w/index.php?title=Mobile_phone_tracking&oldid=529808343, Dec. 2, 2012, download date Apr. 4, 2014, 6 pages.

Location-based service, URL: http://en.wikipedia.org/w/index.php?title=Location-based_service&oldid=530078881, Dec. 28, 2012, download date Apr. 4, 2014, 10 pages.

European Search Report, dated Apr. 17, 2014, for EP13199523.5, 8 pages.

Communication pursuant to Article 94(3) EPC, dated Feb. 27, 2015, for corresponding EP Application No. 13 199 523.5-1958, 11 pages.

Labrador et al., *Location-Based Information Systems: Developing Real-Time Tracking Applications*, "Preface," CRC Press Taylor & Francis Group, Boca Raton, 2010, p. V, XP055171159, 3 pages.

"Media server," Wikipedia, XP055171082, retrieved from http://en.wikipedia.org/w/index.php?title=Media_server&oldid=488206053, on Feb. 20, 2015, 3 pages.

"Mobile device," Wikipedia, XP055171050, retrieved from http://en.wikipedia.org/w/index.php?title=Mobile_device&oldid=530479183, on Feb. 20, 2015, 3 pages.

Carr, "Youtube Pairs With Google TV for Second-Screen Experience. Could iOS Be Next?," *Fast Company*, Nov. 13, 2012, downloaded from http://www.fastcompany.com/3002924/yoooutube-pairs-google-tv-second-screen-experience-could-ios-be-next, downloaded Mar. 30, 2016, 4 pages.

Coulouris et al., *Distributed Systems: Concepts and Design*, Fifth Edition, Addison-Wesley, 2012, 634 pages.

"Geotagging," retrieved from http://en.wikipedia.org/w/index.php?title=Geotagging&oldid=523290988, downloaded on Mar. 31, 2016, 8 pages.

"Google TV," downloaded from http://en.wikipedia.org/w/index.php?title=Google_TV&oldid=530009723, downloaded on Mar. 31, 2016, 6 pages.

Janssen, "Wo bist'n du? Googles Geodienst Latitude," retrieved from http://www.heise.de/artikel-archiv/ct/2011/03/086/@00250@ct.11.03.086-088.pdf, downloaded on Jul. 30, 2015, 3 pages.

Swartz, *Understanding Digital Cinema: A Professional Handbook*, Focal Press, Burlington, MA, 2005, p. 221, 3 pages.

\* cited by examiner

METHOD AND APPARATUS FOR COUPON DISPENSING BASED ON MEDIA CONTENT VIEWING

BACKGROUND

Technical Field

The technical field relates to dispensing coupons to viewers of media content and in particular, providing coupons to an individual to buy the product just after they have viewed a commercial or other media program featuring that item on T.V.

Description of the Related Art

Some mobile devices obtain latitude and longitude coordinates at various times. These devices, such as Smartphones or tablets, are typically carried with a user during the day and therefore have the same latitude and longitude as the user's location. These devices may use GPS, wireless network identification, cell phone triangulation and/or other location methods to determine latitude and longitude.

Mobile devices also send information to other devices, including those connected on the same network or on different networks. These devices may communicate via a cell phone network carrier, data network carrier, wireless network, Bluetooth connections, or other communication methods.

Receiving devices, such as set top boxes, receive content from a content distributor. The received content consists of program and advertising content, as well as content information which may include title, description, length, and other information. Examples of program content include but are not limited to movies, documentaries, series, and audio programs. Examples of advertising content include but are not limited to infomercials, product advertisements, and coupons for particular stores such as department stores, automotive stores, and restaurants.

Broadcasters can currently target advertising at certain households based on demographic information such as age, number of people in a household, income, credit score, etc. In one example Invidi Technologies uses data from sources such as Experian® to target advertisements to set top boxes based on information found in a user's credit report. Determining relevant program and advertising content based on the geocoded location history of set top box users is not currently used.

Some content-generation devices, such as cameras in GPS-enabled Smartphones and GPS-enabled video recorders such as the Sony Handycam HDR-XR520V, are able to capture geocoding information in the form of latitude and longitude and associate it with pictures or video clips during filming. In addition, editing systems exist that allow geocoding information to be edited or inserted into content after generation.

Broadcast content providers such as HBO, Showtime, NBC, and others do not currently include geocoding information in their broadcast content.

BRIEF SUMMARY

Households and businesses typically receive television and audio content through satellite or cable systems. Content providers, including HBO, Showtime, NBC and others distribute content through satellite companies or cable systems operators to customers have a receiving device, commonly known as a set top box. Content consists of program content and advertising content as well as content information. Set top box users select program content to view or to record for later viewing and receive advertising content in various forms, for example when a movie is viewed. The user selects program content to view based on the user's personal preferences.

One way a set top box can enhance and personalize content is to gather user's location history with the user's personal mobile device, such as a Smartphone or tablet, which can geocode the user's location in the form of latitude, longitude, and time. This location history can then be mapped back to businesses, home addresses, vacation spots, schools, traffic routes, and so on to determine the locations the user has been in proximity to. The set top box can analyze the user's location history, user preferences, and content information to determine and present content relevant to the user. Note, in this specification a location a user "has been" at may also include where the user currently is.

If relevant content is found, the user can be notified in several ways. The set top box might suggest upcoming programs to watch or record, for example "I noticed you were at Sports Authority field, would you like me to set up a recording for the Bronco game this weekend?" Or, make suggestions like "You recently visited Hawaii, and I noticed there is a special documentary about the island of Kauai on this weekend." These suggestions, or the content itself, can be presented on a television connected to the set top box or can be delivered to the user's mobile device.

In addition to program suggestions, the set top box can notify the user of advertising content based on the user's location. For example, if the user regularly passes by an Applebee's restaurant around lunch time, an advertisement or coupon for Applebee's can be presented to the user. If the set top box has a real-time connection to the user's mobile device and therefore knows where the user currently is, a coupon can be sent directly to the user's mobile device if the user is near an Applebee's restaurant. The coupon can also be adjusted based on the real-time status of the restaurant, for example a more favorable coupon offered if the restaurant is not busy. This may be a part of a vendor subscription service for enhanced advertising operated by set top box providers.

Locations can be tracked for multiple users associated with a set top box. The set top box can use relationships between the users and the proximity between the users known in real-time to present different content based on the users' situations. For example, if the set top box determines that two parents were next to each other and were near a Cheesecake Factory restaurant, a two-for-one coupon may be pushed in real-time to the parent's mobile device for the restaurant's lounge. If the two parents and two children are in a car driving by a Cheesecake Factory, the set top box may instead push a coupon for a free entrée and dessert at the restaurant's main dining room to the parents' mobile devices.

Users may also be alerted to special news program content depending on location history. For example, if the set top box determines a user's normal commute route, any content describing accidents or construction occurring along that commute route can be sent to the user. Or, if the set top box knows a user is a child, any "breaking news" or alerts occurring around the child's location, or for example near the child's school, can be sent to the parent's mobile device.

A user may also receive information based on the geocoding locations of other users. For example, if a husband (or wife) spends two hours at a Nordstrom's store, the wife (or husband) may receive a coupon to that store with an explanation that the spouse had recently gone into the store and may like something from there.

A user can also query the set top box to find relevant content or information. For example, to find out whether there are coupons or specials for stores near the user or if there are any documentary programs on locations where the user has travelled in the last six months.

In these ways, one or more users associated with a set top box can receive enhanced viewing of program and advertising content based on their present location or location history.

In addition, broadcast content such as individual programs or advertisements, or scenes within a program or advertisement, may also contain geocoding information that describes location information associated with that content segment. For example, the filming location of a scene, the location represented in the scene, the location of a landmark viewable in the scene, the filming location of the advertisement, or the locations where a coupon may be redeemed, can be geocoded and included in the content.

By extracting this information, the set top box enables a user to search program or advertising content for location information. For example, a user can query "Where are all of the filming locations for Top Gun?" or "Where was the scene that I am watching now filmed?"

By combining user geocoding information and content geocoding information, the user can make more powerful queries. For example, "What movies have been filmed near my current location?", or "What movies have been filmed at the locations I have been at over the last six months?"

Using geocoding information tracked from a user's mobile device and geocoding information embedded in content, the set top box can enhance the viewing experience and value of the content to the user by gathering and translating the data in relevant and useful ways.

In addition, businesses such as content providers, local businesses, satellite companies and cable operators, can insert coupons into content, including advertising content, displayed via a set top box. These coupons may appear to the user viewing the content in a number of forms, such as a text "hotlink" overlaying a video image asking the user to click user the remote control to select the coupon, or as a QR image the user reads off of the screen using a Smartphone. This coupon, redeemable for goods or services, may be available to a user on viewing the content during the original broadcast date, or some amount of time past the viewing date (for example, if the content was recorded vs. being watched live). The coupon would then be made available to the user such as electronically on a Smartphone to be redeemed within the terms and conditions of the coupon.

DETAILED DESCRIPTION

Described herein are systems, methods, and apparatus for gathering geocoding information for one or more users associated with a set top box, sending that information to a set top box to determine content relevant to the user, and then presenting that content. User geocoding information, which may take the form of latitude, longitude and time, is regularly gathered from a mobile device which is personal to the user and therefore generally tracks the location of the user throughout the day. Also described are systems, methods, and apparatus for gathering geocoding information associated with broadcast content, storing that information at a set top box, and using that information in addition to other content information to enhance the user's viewing experience.

Figure 1:
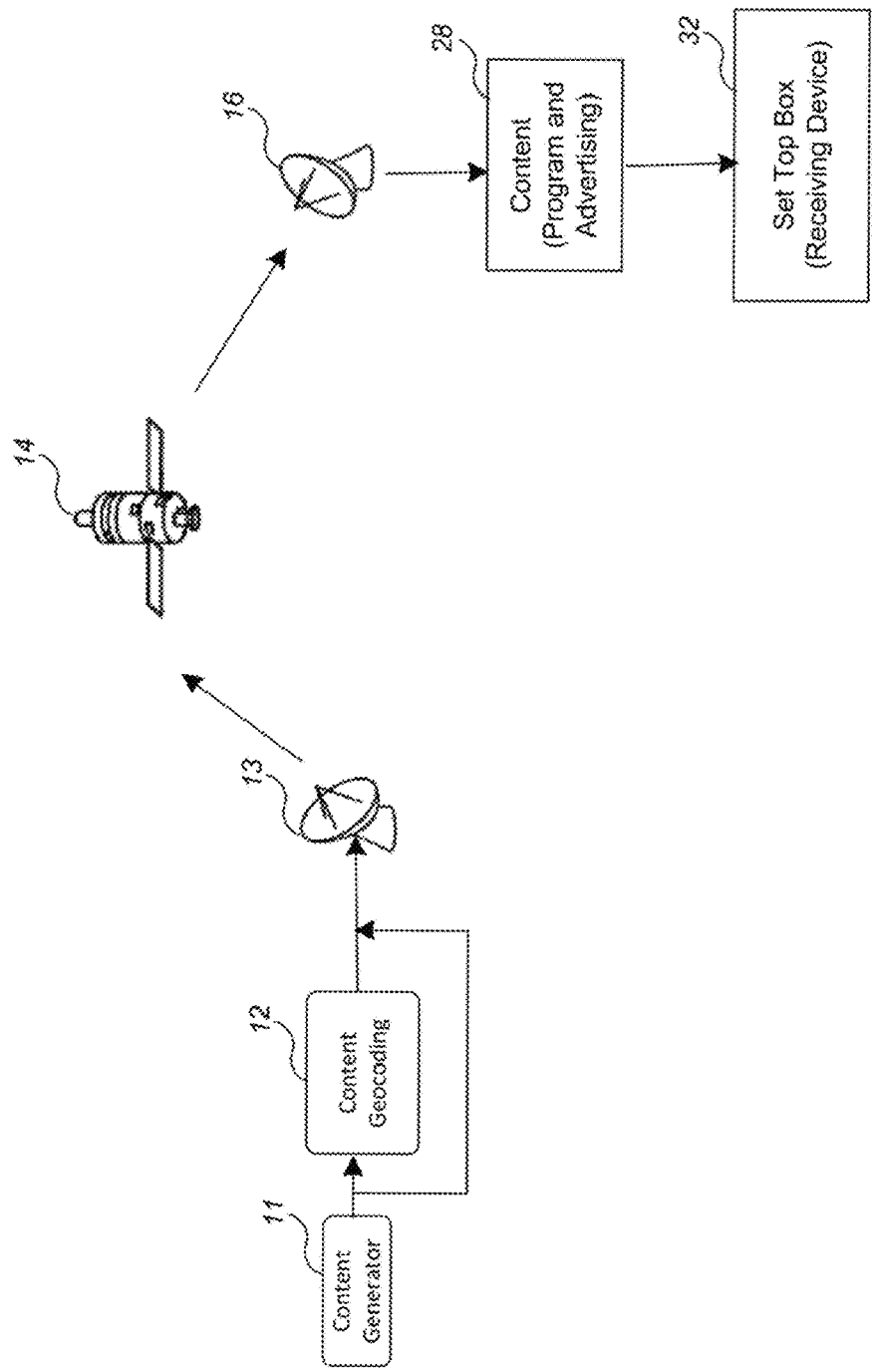
FIG. 1: Geocoding Broadcast Content

FIG. 1 is an overview diagram of a system embodiment in which content flows from a content generator 11 through the broadcast system to the Set Top Box 32. Content 28 consists of program and advertising content and content information, for example information contained in program guides. Geocoding information 12, for example the location where a scene was filmed, can be added to content during content generation time or added later through editing prior to broadcast. In one embodiment content flows to an uplink center 13 to a satellite 14 and to a receiver dish 16. The content is then sent to a set top box 32, which extracts content information and combines it with other information the set top box has collected to enhance the user's experience with the content.

Figure 2:
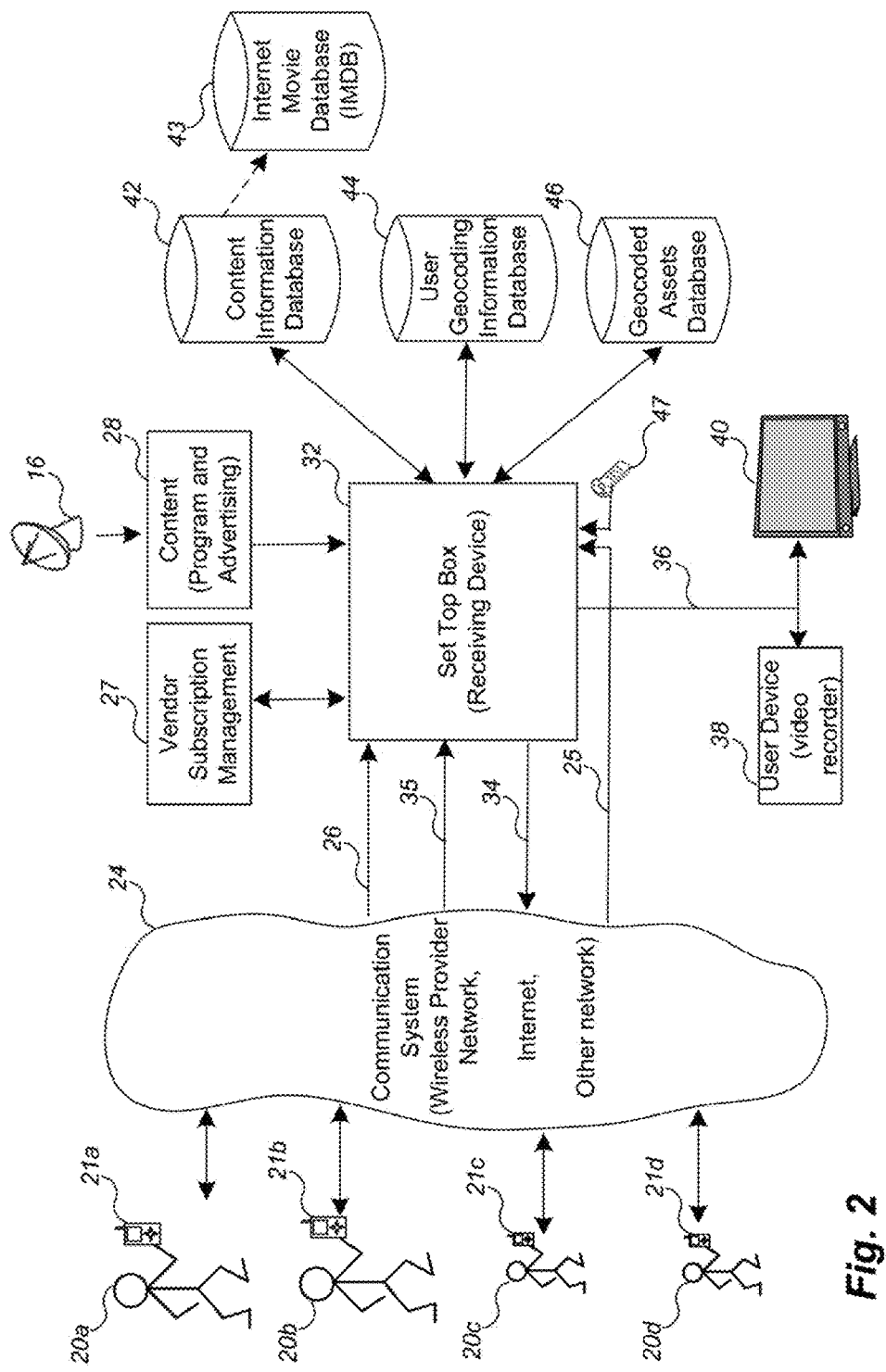
FIG. 2: Overview of the System

FIG. 2 is an overview block diagram of a system embodiment in which user geocoding information and content information including content geocoding information is used to automatically determine and present content relevant to a user.

One or more users 20a-20d associated with a set top box each carry a mobile device 21a-21d that can determine geocoding information for the mobile device's location. An example is a GPS-enabled Smartphone or tablet that is personal to the user and travels with the user throughout the day. As a result, the mobile device can identify the locations the user has been at.

The mobile devices and the set top box may be connected by a Communication System 24 in a number of ways. In one embodiment, if the set top box and mobile device are on the same network, an API would exist to allow the set top box to receive user geocoding information from the mobile devices 21a-21d. In another embodiment, user geocoding information is collected by the wireless provider network servicing the mobile device, for example, ATT, Sprint, or Verizon, and sent back to the set top box via the Internet for processing in real-time.

In one embodiment, if a user's mobile device has a real-time connection to the set top box, user geocoding information would be sent 26 directly to the set top box 32 and stored in the User Geocoding Information Database 44. Otherwise, the mobile device stores the user geocoding information locally until the device is connected to the set top box 32, at which time the stored geocoding information is sent 26 and stored in the User Geocoding Information Database 44. This database can reside on the set top box 32 or reside on one or more servers at a remote location.

Each user has the ability to opt-in or opt-out of having the user's locations tracked and sent to the set top box 32.

Content 28 is received by the set top box 32 from receiver dish 16. In other embodiments, a cable system head end may take the place of receiver dish 16. Content includes program content such as movies, documentaries, and music, and advertising content such as infomercials, special offers, or coupons. Content information describes and categorizes content, which may include but is not limited to program type, program description, channel, start time, length, vendor name, and geocoding information that describes, for example, the filming location of a movie scene.

The set top box 32 extracts and stores content information in the Content Information Database 42. This database may also work in conjunction or integrate with other databases, including commercial databases such as the Internet Movie Database (IMDB) 43, to extend searches for relevant content.

A Geocoded Assets Database 46 contains location names and corresponding geocoding information. The set top box uses this database to translate back and forth between geocoding information in latitude/longitude form, and a specific address, location name, or other location identifiers.

Once the set top box 32 has determined relevant content to present to a user it can deliver content locally 36 to any suitable device operable to present the content in video or audio form to the user. Examples of a presentation device include but are not limited to a television 40, a digital video recorder 38, a game system, or the like. The set top box can also present content remotely 34 through Communication System 24 to devices including a user's mobile device, such as a Smartphone or tablet with the ability to view video and play audio.

Content information may also be presented, and includes text-based descriptions of content, audio description of content (e.g. voiceovers), QR Codes identifying filming locations of movie scenes, maps showing geocoding information contained in content segments, and the like.

A user can also send a User Query 35 about program or advertising content directly to the set top box 32. For example, "Are there any stores with coupons or specials near me?", "What scenes in Top Gun have been filmed within 100 miles of my location?", or "What movies that I have watched in the last 6 months were filmed in Austin TX?". These User Queries may be sent from a user's mobile device 21a over Communication System 24 to the set top box 32, or sent directly to the set top box via a remote control 47 or other device connected directly to the set top box.

Figure 3:
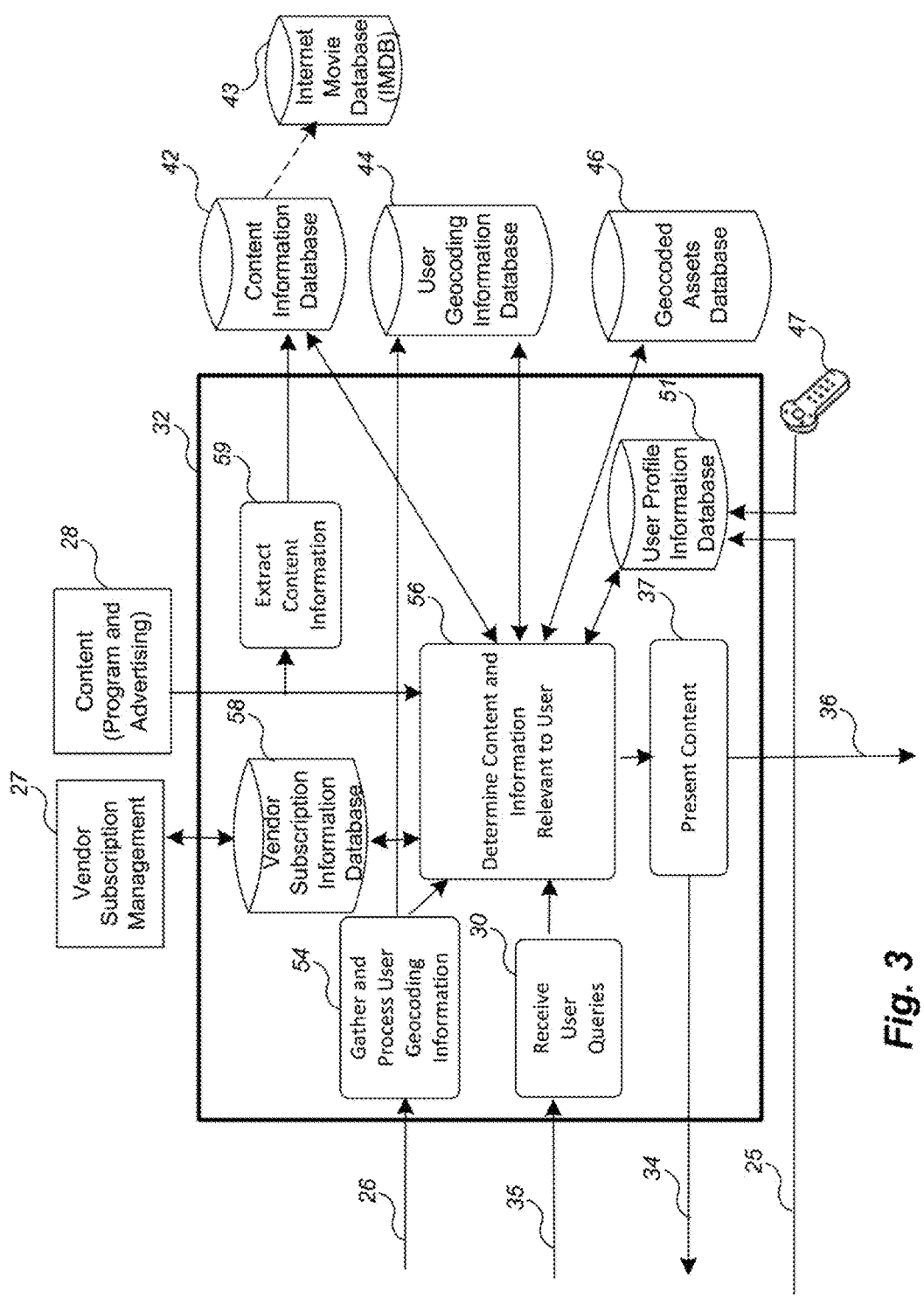
FIG. 3: Overview of the Receiver/Set Top Box Operation

FIG. 3 is detailed embodiment of a set top box 32. The set top box has a processor, memory, storage, and software to accept inputs and to present content relevant to a user.

User geocoding information 26 is received by the Gather and Process User Geocoding Information 54 process from the one or more users' mobile devices 21a-21d associated with the set top box 32. This information includes at least latitude, longitude, and time that identifies where the user has been. If the user's mobile device is connected in real-time, the set top box will know the user's current location. Geocoding information is stored in a User Geocoding Information Database 44 located in the set top box 32 or may be located in one or more remote servers. In one embodiment, if the user's mobile device 21a-21d is connected in real-time to the set-top-box 32, the user's geocoding information is also sent to the Determine Relevant Content to User process 56 to determine what program or advertising should be immediately pushed out 34 to the user based on the user's location.

Broadcast content 28 is received that includes program and advertising content, and content information that describes the content, such as program guides or embedded geocoding information for a content segment. The set top box analyzes and extracts content information from the broadcast content using the Extract Content Information process 59 and stores the information in the Content Information Database 42. The set top box will use this content information to determine whether or not content may be relevant to a user.

Content information includes geocoding information, program information, and advertising information. Examples of geocoding information may include the latitude and longitude of the filming location of a scene in a movie, the location of a landmark appearing in a scene, such as a restaurant or monument, or the location where a broadcast sporting event is being held. A content segment may contain one or more geocoding tags. For example, a movie scene may have a geocoding tag identifying where the scene was filmed and another identifying the location the scene represents in the story. Or a food program may have geocoding tags for where the ingredients came from and a geocoding tag for where the program was filmed, for example in Maui. Advertising content may have multiple geocoding tags associated with the locations where an advertised special or coupon will be accepted.

Examples of program information may include the type of program (e.g. sports, drama, game show, symphony, documentary), subject of program (e.g. Broncos, Shakespeare, Jeopardy, Denver Symphony, Golden Gate Bridge), or location name (e.g. Mile High Stadium, Ashland, Burbank, Denver, San Francisco). Examples of advertising information include type of product (e.g. sports clothing, food, vacation packages, and tickets) or location of stores where the product may be purchased.

The User Profile Information Database 51 stores information about one or more users associated with a set top box. This information may include the user's name, mobile device identifier, general user information such as age and sex, user content interests, default searches for relevant content, and relationships to other users associated with the same set top box (e.g. spouse, child, manager, employee, etc.). This information is used to determine what and how relevant content will be sent to a user and under what conditions. This way the user can have the set top box search for and present relevant content without requiring further input from the user.

This database may also store user content presentation preferences. For example, if the set top box should automatically queue relevant program or advertising content for later viewing, or only notify the user that the content is available; if movies containing scenes filmed within twenty miles of a user's location over the last six months should be automatically recorded; if coupons should be pushed immediately to a user's mobile device or queued up for later use; or if to present descriptions of locations on a television either as text, QR Codes, or audio voiceovers. The user can specify a preferred presentation device, such as a television connected to the set top box, the user's mobile device, or another device on the Internet.

The User Profile Information Database 51 may also store user proximity preferences. For example whether to push a coupon to the user's mobile device only if the store location is currently close to the user, or to push the coupon if the store is close to the user's regular commute path. Other attributes of proximity are discussed below.

Information in the User Profile Information Database 51 may be updated from mobile devices over the network 25, 24 or from a remote control 47 attached to the set top box. User profile information may also be updated from information from other sources, such as the types of on-line or video-on-demand purchases a user has made.

Specific user queries 35 can be received by the Receive User Queries process 30. User queries can come from a remote mobile device 21a-21d, or from devices attached to the set top box, for example a remote control 47. The form of the queries can be text-based or spoken requests, or can be locations that are marked by the user while viewing content, for example by pressing a "locate" button on a remote control. These queries are received, parsed, and sent to the Determine Relevant Content to User module 56.

User queries about program content may include: "What scenes have been filmed or referenced near my current location?" "What movies have been filmed near any location I have been in the last six months?" "What movies have been filmed within 500 miles of Johannesburg?" "What is the location of the movie scene I am viewing now?" "Where is the nearest landmark depicted in this scene located?" "What locations have been marked in the content?" "Show me a map of all locations where Top Gun was filmed." "Where is the location of the restaurant in Top Gun?" "What is the location of the 'Sleepless in Seattle' house?" "Where is the location of the restaurant in the scene that I am viewing now?" "On which locations in Universal Studios was Back to the Future filmed?" or "Where is the restaurant located that served apple pie in the series Twin Peaks?"

User queries about advertising content may include "What coupons are available for vendors where I am now?" "Are specials available for stores in my commute area?" or "Are there restaurant coupons near where my children are now?"

The query results may appear in a number of forms, such as streaming content, as a text message, as an email, as a voiceover, as a QR code on a mobile device, as locations appearing on a map, or as some other form or a combination of forms.

The Present Content process 37 determines how to present relevant content and content information from the set top box 32 to users. Where and how content is presented depends on the User Profile Information 51, the User Query 30 request (if any), presentation devices available to the user, and whether the presentation device has a real-time connection to the set top box 32.

Content may be sent to the user on a local presentation device directly connected to the set top box 32 such as on a television 40 or a video recorder 38, or on remote devices over the Internet, such as the user's mobile device 21a-21d. Content information can also be displayed while watching the content, for example a text description or a QR code sent in response to a "location query" while watching a movie.

The Present Content process 37 may notify a user of relevant content for viewing by email or text-message notifications sent to a user's mobile device 20a, or by notifications that appear when viewing a presentation device 40. A user can also be asked if the content should be recorded for later viewing on a device such as a video recorder 38, or all relevant content should be put into a queue for users to view when they are ready.

The Determine Content and Information Relevant to the User process 56 examines the contents of the User Profile Information Database 51 to determine the user preferences for content to automatically present (or "push") to a user, and examines any user queries from the Receive User Queries process 30 to determine the user preferences for content presentation. The process then accesses the Content Information Database 42, User Geocoding Information Database 44, and Geocoded Assets Database 46 to determine what and how relevant content and information should be presented to the user.

In one embodiment, the location of the one or more users primarily determines the relevant content and information to be presented. Location may be determined by retrieving user geocoding information for one or more users from the User Geocoding Information Database 44 and comparing the information to locations found in a Geocoded Assets Database 46 to determine the locations the user has been in proximity to. Examples of locations include businesses, home addresses, vacation spots, schools, landmarks, traffic routes, etc. The Content Information Database 42 is then searched for content related to these user locations, either through descriptions in content information or through geocoding information associated with specific content segments, to determine relevant program and advertising for the user.

Parameters describing proximity for a user can be found in the User Profile Information Database 51, in a specific User Query 30, or both. Proximity of a user to a location includes but is not limited closeness in distance to a location (nearness), frequency of nearness to a location, time spent near a location, or a route typically driven, for example a commute path. Proximity may also include deviation from normal travel which includes but is not limited to travel patterns on weekdays vs. weekends, travelling outside of a user's normal commute path, or taking a vacation outside of the user's normal travel area. For example the set top box may make program suggestions based on a location, for example "I noticed you were at Sports Authority field, would you like me to set up a recording for the Bronco game this weekend? " Or, "You recently visited Hawaii, and I noticed there is a special documentary about the island of Kauai on this weekend. Shall I record it for you?"

Proximity may be defined to include locations of someone other than the user, for example a husband, a wife, or children, or to include the locations of multiple users and their nearness to each other.

For example, family members father 20a, mother 20b, 16 year old daughter 20c, and 12 year old son 20d, each carrying mobile devices 21a-21d are sitting in the same room containing a presentation device 40 connected to a set top box 32. If the set top box has a real-time connection to the mobile devices, the set top box will know that a family is in the room and suggest family program content such as G-rated movies and advertising content such as family restaurants or family vacations. This may be different than the program suggested if only the two adults 20a and 20b were in the room when, for example, a crime drama may be suggested.

Another example involves travel. If the family of four is in a car and drove past a restaurant, and the set top box was in real-time communication with each family member's mobile device, advertising information or a coupon for a family dinner and dessert may be immediately delivered to the parents' mobile devices. If only the parents 20a and 20b are in the car and drove by a restaurant in the evening, an advertisement for the restaurant's lounge may be sent to them. As a further example, if a father 20a and son 20d are travelling in a car after spending an hour attending a soccer game at a local stadium and drive by a sporting goods store, an advertisement may be sent to the father's mobile device 21a offering a discount on youth soccer equipment, and a message sent to both the father and son about a documentary on soccer techniques showing that evening and ask them if it should be recorded for later viewing.

In another example, a user profile may cause the set top box 32 to notify the user when new program content arrives that had been filmed at a location that the user had been in proximity to over the last six months, or if new advertising content arrives for locations the user had been near during the last two weeks. In addition, a user can designate specific locations or users for special consideration. For example, a wife could mark her favorite store in her profile, and a coupon to the store would be pushed to her husband whenever he drives by the store within a month of her birthday.

In addition, users could keep lists, like a registry, to push coupons to the user or other users associated with the set top box when a user is in proximity to a store that sells the item.

In another embodiment, a subscription service may be run by the provider of the set top box, for example by EchoStar®, that drives vendor advertising content to set top box users based on users' locations. For example, vendor subscription information would be held in the Vendor Subscription Information Database 58 and would be managed by a Vendor Subscription Management process 27. Vendors would sign up for advertisements or coupons to be "pushed" to users based on based the characteristics of the users, such as a user's proximity to a vendor. This information would be used by the Determine Content and Information Relevant to User 56 process to determine what content to push to the user. For example, a local restaurant may push a "walk in now & get 10% off" coupon to a user depending on who is with the user (e.g. a family driving by the restaurant), and how busy the restaurant currently is. A restaurant with open seats may push a coupon out to users in the vicinity of the restaurant. A store with excess inventory levels may push a coupon out to users in the vicinity of the store. The proximity of the user to the vendor may vary from a user simply passing by, to a user who is frequently in the area. This allows vendor-generated ads that are tailored to one or more users given the users' changing situations during the day.

In another example, an upscale restaurant can pay a fee to place geocoded tags in program content that references the restaurant, for example if it is featured in a movie scene. Once the user watches the geocoded movie, a notice can be sent to the user's mobile device if the user drives by the restaurant, the user asked if the movie should be re-recorded for later viewing, or a restaurant coupon pushed to the user.

In another embodiment, a coupon may be presented to a user by a business such as a content provider, local business, satellite company or cable operator when viewing content, including advertising content, displayed via a set top box. These coupons may appear to the user viewing the content in a number of forms, including but not limited to a text "hotlink" overlaying a video image which the user accepts by using the set top box remote control, or a QR image displayed on the screen and read by the user's Smartphone.

Many users will have linked their cell phone, such as a Smartphone to their set top box previously to permit the content sent to their set top box to be provided simultaneously on their cell phones. This is particularly beneficial if the user is stuck in traffic as they drive to home to watch an important program, such as a football game of their alma mater. The coupon can be sent as an electronic coupon to the same cell phone that is linked to their set top box. The coupon can be redeemed at merchant, such as a grocery store, by providing an electronic download from the cell phone to the merchant at the time of purchase.

This coupon, redeemable for goods or services, may be available to a user based on the profile of the user as described above, or on when the content available from the set top box was viewed. For example, a coupon may only be presented to the user if the content was viewed by the user during the original air date, or some amount of time past the air date to allow for time-shifted viewing. For example, a network plans to show the movie "Top Gun" and sells time to a local Harley Davidson dealership to display a discount coupon for that dealership whenever a motorcycle is shown in the movie. The network, to encourage real-time viewing of the content and the advertisements associated with the content, may require that the coupon be available only when watching the movie during the original air time. In another example, the coupon may be made available if the movie was viewed within six hours of recording to accommodate time-shifted viewing.

In another embodiment, a merchant may pay for commercial time on a program. Examples of such commercials might be for a Big Mac at McDonald's, Tires from Les Schwab Tire Company, a wrench and socket set at Sears, fresh fruit, such as apples or pears at Safeway, or beef that will soon be past it expiration date at Kroger's meat counter. The merchant wishes to encourage a viewer to watch the commercial since the merchant does not wish to go to the effort and expense of making and airing a commercial only to have the viewers skip it using DVR technology or the Hopper DVR, now offered for sale by Dish Network. Accordingly, as the commercial concludes, a coupon will be sent by electronic delivery to the set top box. In one embodiment, the coupon will only be delivered at the conclusion of viewing the entire commercial. If the entire commercial is not viewed, such as by the user changing channels or skipping it using the Hopper or other DVR technology, then the coupon will not be delivered.

The merchant supplying the coupon can select the parameters for delivery of the coupon. In one embodiment the coupon will only be provided if the viewer watched the commercial live, not on delayed or recorded play. In other embodiments, the merchant can set a threshold time for viewing within a set time after being broadcast, such as 10 minutes, 5 hours, 2 days, or the like. Namely, if the user views the entire commercial within the threshold time of its live broadcast, such as 10 minutes if that is the threshold, then the coupon is delivered at the end of the commercial.

In order to entice a viewer to watch the commercial, the merchant can place a message at the start of the commercial that if the entire commercial is watched, without changing stations or putting it on hold, a valuable coupon will be provided. Or, the providing of coupons can be random, without advanced notice to encourage the users to watch as many commercials as possible in hope of getting a coupon for one or more of the items for a commercial they viewed.

The coupon can be made available to a user in a number of ways such as but not limited to being electronically downloaded onto a Smartphone or being mailed to the user either electronically or via the US mail. The coupon would then be redeemed according to the terms and conditions of the coupon which may include timeframes for redemption. In some embodiments, to receive the coupon a user may have to make a payment.

Also, the coupon may be modifiable at the time the user accepts the coupon, for example the terms and conditions of the coupon may change based on the business conditions or inventory levels of the coupon offeror. For example, the coupon for a local grocery store may have a redemption life of hours if the merchant wants it be used to sell to excess perishable food items. For example, if Safeway or Kroger find they have a large supply of beef or bread that is about to reach an expiration date, they can put a coupon onto a local TV commercial that is within their area. The redemption can be immediate and expire within twelve hours if not redeemed within that time to permit the grocery store to be able to sell the product at or near full price, or even at a discount rather than need to discard the product entirely. This will permit the merchant to make money on selling products that the merchant would otherwise need to discard. Since the content provider knows the address of each user's home, the merchant can target the advertisement and the coupon delivery to those homes that live within an acceptable driving distance of the stores having excess product that they wish to sell and not provide the coupon to homes that are too far from the stores.

To encourage real-time viewing, coupons may have an expiration date to claim them, separate from the expiration date to use them. Some broadcasters may choose to only offer the coupon when the viewer is watching in real time. In one embodiment, the method will recognize that the program is being viewed live and not being played back from DVR or other recording. This option exists because the user may be watching the event live, but perhaps in delayed/paused buffer mode where an implicit time delay is induced. This happens when the user hits the pause button on a live program, walks away for some amount of time, and then comes back and presses play/resume. It is not always obvious to the viewer that the event is being played back from the pause buffer, but the set top box will know by software monitoring the viewing stream as compared to the receiving stream to determine whether the content is being seen live by the viewer or if there has been a delay, and if so the length of the delay.

The coupons may have geocoded information associated with them to assist with presenting to the user when the user is in proximity of the item. In addition, the coupons may have various terms associated with them. For example, if the coupon was claimed the day it was issued the discount is 40%, claimed the day after: 25%, claimed within one week: 15%. The user would be given the information about the declining value of the coupon. This will permit a merchant to move products more quickly that have an expiration date or if the merchant needs to clear out shelf space on a rapid basis and having the product sold today as compared to the next day has higher value to the merchant.

Although these above examples relate to families, one with skill in the art will recognize that analogous examples could apply to other types of users associated with a set to box, for example employees at a business.

Figure 4:
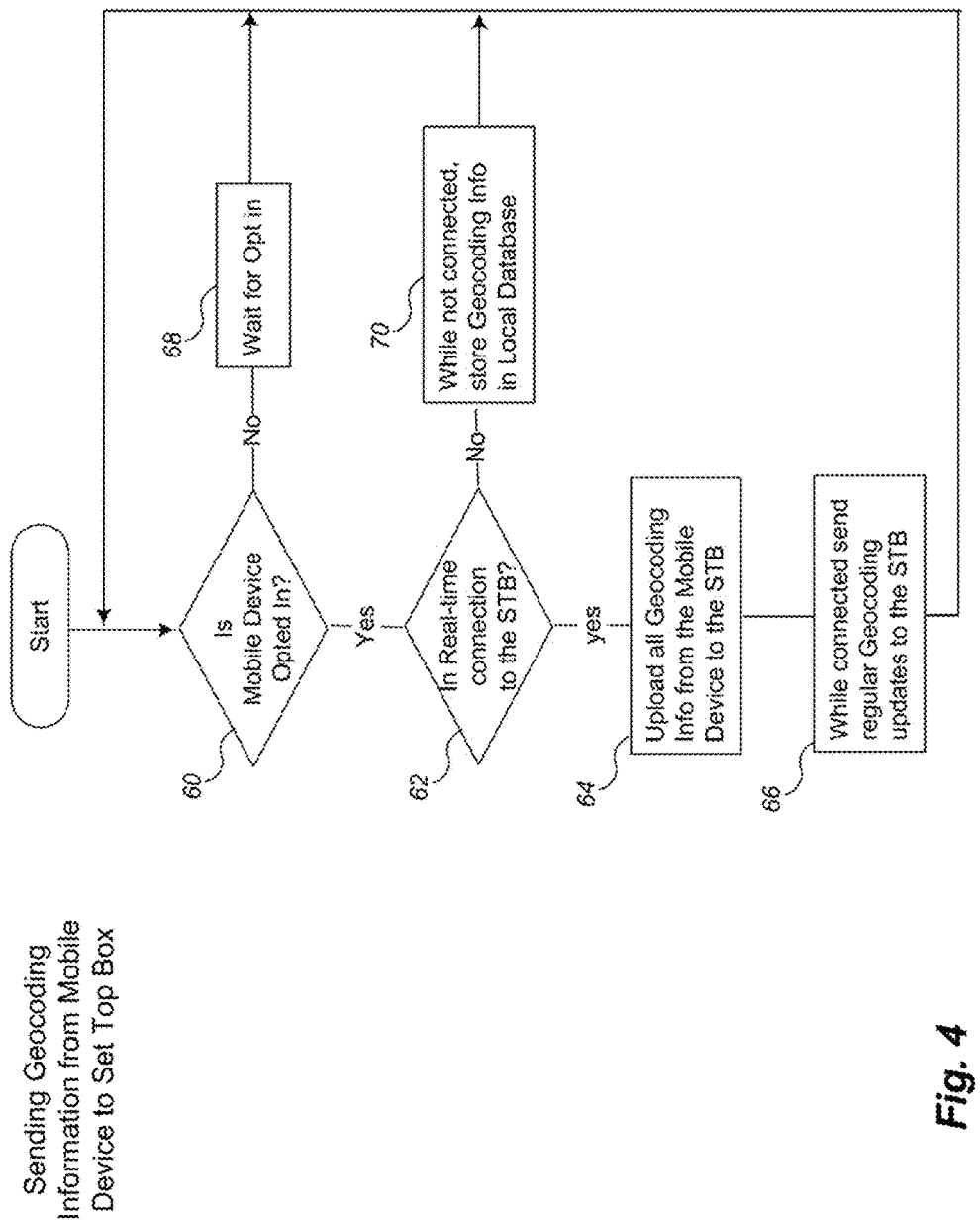
FIG. 4: Process of a Mobile Device sending Geocoding Information to the Set Top Box

FIG. 4 is a flow chart describing a process embodiment for sending geocoding information from a mobile device to a set top box. If the user "opts in" 60, the user's mobile device then checks if there is a real-time connection 62 to the set top box 32. If not, then the mobile device will store geocoding information on the mobile device 70 for later transmission to the set top box 32. If there is a real-time connection, the mobile device will upload all stored geocoding information 64 to the set top box 32 and will continue to send geocoding updates 66 while the mobile device is connected in real-time to the set top box 32. If the user's mobile device is not "opted in," then the application waits 68 until the user "opts in" to gather and send geocoding information.

Figure 5A:
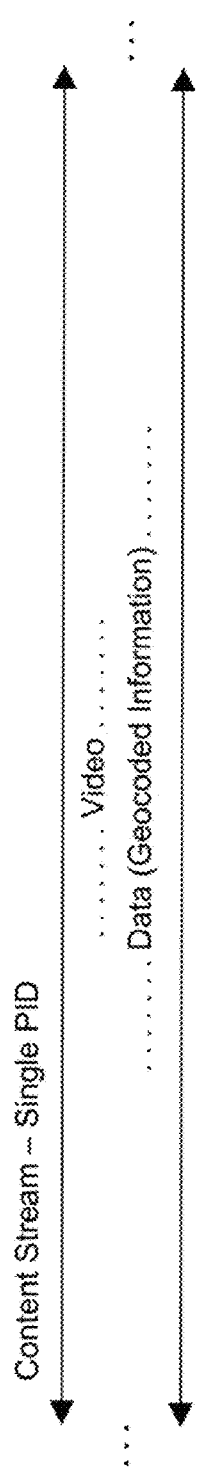
FIGS. 5A and 5B: Associating Geocoding with a Video Stream
Figure 5B:
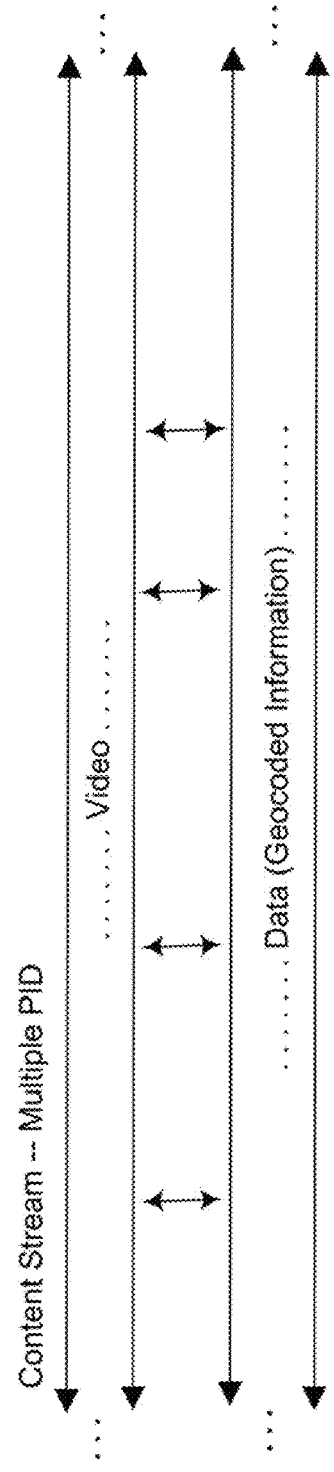

FIG. 5A shows an embodiment of associating geocoding information with content where the information is encoded within the video PID. FIG. 5B shows geocoding information sent in a separate PID datastream, with data bookmarked back into the video PID. A segment of content, for example a scene in a movie, may have multiple geocoded information associated with that segment.

In addition to the embodiments described, there may be multiple set top boxes in a location with multiple users, which can be connected such that they operate as described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such but should be construed to include all possible embodiments along with the full scope of equivalents to which such claims can be given.

The invention claimed is:

1. A method, comprising:

receiving, by a set top box, a live stream of media content;

receiving, by the set top box, advertising information that identifies a type of product and a location where an electronic coupon is redeemable, the electronic coupon enabling purchase at a reduced price of the type of product;

receiving, by set top box, content information that identifies one or more segments of the media content in which the type of product is displayed;

receiving, by the set top box, information identifying a location of a user associated with the set top box;

determining, by the set top box, whether a distance between the location of the user and the location where the electronic coupon is redeemable is less than or equal to a predetermined distance;

outputting, by the set to box, a live viewing stream that is live streaming video from the set top box to a television;

executing software, by the set top box, that monitors the live viewing stream as compared to the received live stream;

outputting, by the set top box, to the television an electronic link to the electronic coupon whenever the type of product is displayed by the television based on the outputting of the live viewing stream using the content information identifying the one or more segments of the media content, if the distance between the location of the user and the location where the electronic coupon is redeemable is determined to be less than or equal to the predetermined distance and the software determines, by monitoring the live viewing stream as compared to the received live stream, that the live viewing stream is output from the set top box to the television within less than a threshold time after the live stream of media content is received by the set top box;

receiving, by the top box set, an input from a remote control of the set top box;

when the input from the remote control corresponds to a selection of the electronic link, sending, by the set top box, the electronic coupon to a mobile device linked to the set top box, the mobile device being different from the set top box; and concluding, by set top box, the receiving of the media content without displaying the electronic link to the electronic coupon if the distance between the location of the user and the location where the electronic coupon is redeemable is not determined to be less than or equal to the predetermined distance and the software determines the live viewing stream is not output from the set top box within less than the threshold time after the live stream of media content is received by the set top box.

2. The method according to claim 1 wherein the threshold time is selected by a merchant offering the product for sale.

3. The method according to claim 1 wherein the media content is a commercial for a particular product.

4. The method according to claim 1 wherein the media content is a movie that includes a particular product used in in the movie.

5. The method according to claim 4 wherein the particular product is a motor vehicle being driven by one of the actors.

6. The method according to claim 5 wherein the motor vehicle is a motorcycle.

7. The method according to claim 1 wherein the threshold time corresponds to an end user watching the media content live, at the same time it is being delivered to the configured computing system.

8. The method according to claim 1 wherein the threshold time is ten (10) minutes.

9. The method according to claim 1 wherein the threshold time is five (5) hours.

10. The method according to claim 7 wherein the configured computing system is a set-top box.

11. The method according to claim 3 wherein the particular product is a perishable good.

12. The method according to claim 11 wherein the perishable good is a food product.

13. A system, comprising:
a set top box;
a processor within the set top box; and
a non-transitory computer-readable memory communicatively coupled to the processor, the memory storing computer-executable instructions that, when executed, cause the processor to:
receive a live stream of media content;
receive advertising information that identifies a type of product and a location where an electronic coupon is redeemable, the electronic coupon enabling purchase at a reduced price of the type of product;
receive content information that identifies one or more segments of the media content in which the type of product is displayed;
receive information identifying a location of a user associated with the set top box;
determine whether a distance between the location of the user and the location where the electronic coupon is redeemable is less than or equal to a predetermined distance;
output a live viewing stream from the set top box to a television;
monitor the live viewing stream as compared to the received live stream;
output an electronic link to the electronic coupon whenever the type of product is displayed by the television based on the outputting of the live viewing stream from the top set box to the television using the content information identifying the one or more segments of the media content, if the processor determines the distance between the location of the user and the location where the electronic coupon is redeemable is less than or equal to the predetermined distance and the processor determines, by monitoring the live viewing stream as compared to the received live stream, that the live viewing stream is output from the set top box to the television within less than a threshold time after the live stream of media content is received by the set top box;
receive an input from a remote control of the configured computing system while the electronic link to the electronic coupon is displayed; and
responsive to receiving the input from the remote control of the set top box while the electronic link to the electronic coupon is displayed, send the electronic coupon to a mobile device linked to the set top box, the mobile device being different from the set top box.

14. The system of claim 13, wherein the media content is a commercial for a particular product.

15. The system of claim 13, wherein the media content includes a particular product used in the media content.

16. The system of claim 13, wherein the threshold time corresponds to the user watching the media content live, at the same time it is being delivered to the configured computing system.

17. The system of claim 13, wherein the configured computing system is a set-top box.

* * * * *